Dec. 26, 1944.  E. D. LILJA  2,365,709
CONDITION CONTROL
Filed Sept. 13, 1941
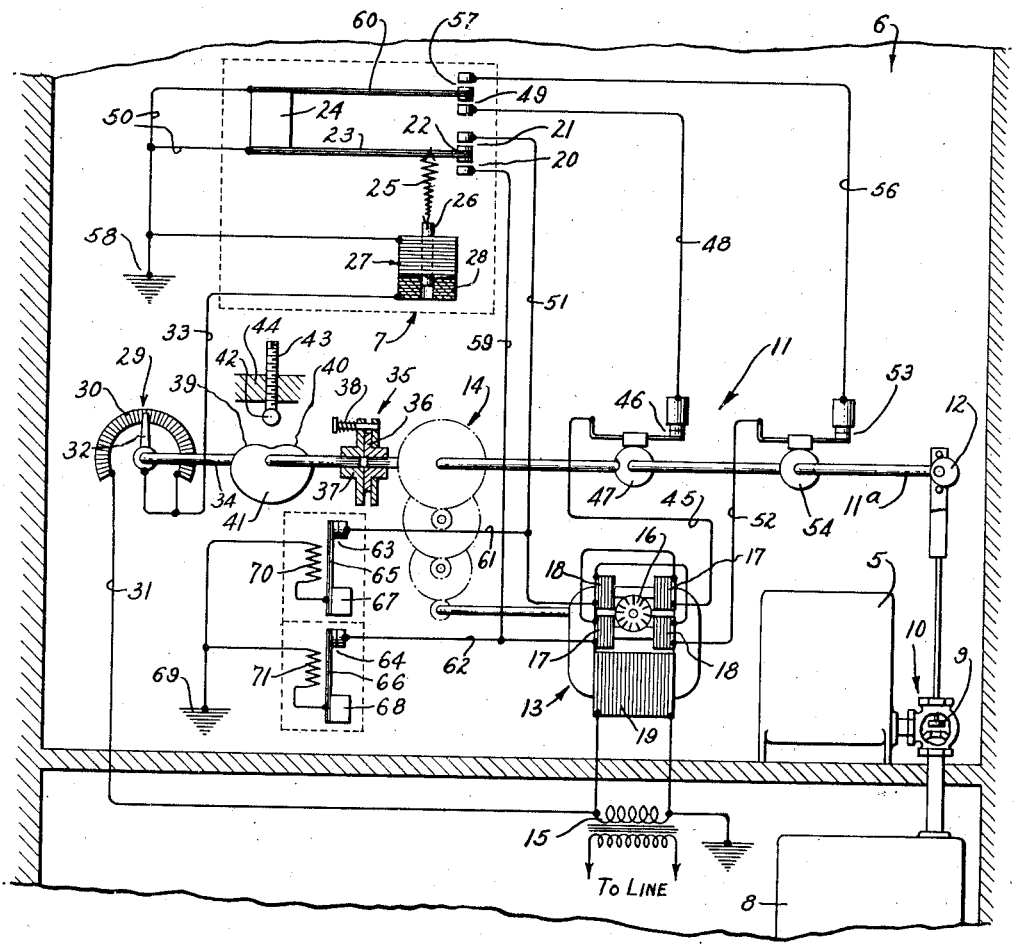
INVENTOR
Edgar D. Lilja
BY
Parker, Carlson, Pitzner, Hubbard
ATTORNEYS Patented Dec. 26, 1944

2,365,709

UNITED STATES PATENT OFFICE 2,365,709

CONDITION CONTROL

Edgar D. Lilja, Rockford, Ill., assignor to Barber-Colman Company, Rockford, Ill., a corporation of Illinois Application September 13, 1941, Serial No. 410,681

8 Claims. (Cl. 236—68)

This invention relates generally to systems for automatically controlling a condition regulating device such as a switch, a valve, a voltage regulator, a speed controller, etc., to maintain a uniform value of a mechanical, electrical, or chemical condition. The invention has more particular reference to controls of the so-called resetting proportioning type in which a primary response or movement by the regulating device occurs in proportion to the degree of deviation of the controlled condition from the value desired to be maintained and is followed by a slow secondary response or resetting action that causes sufficient further correcting movement of the regulating device to effect complete restoration of the controlled condition to the desired value.

The general object is to provide a control of the above character which is simpler in construction than prior controls. This object is carried out by utilizing the power actuator for the main regulating device as a source of power to produce the slow resetting action.

Another object is to operate the main regulating actuator intermittently to obtain the desired slow rate of the secondary response.

A further object is to limit the extent to which the secondary actuation of the main actuator affects the means by which the primary response or proportioning action is controlled.

Other objects and advantages of the invention will become apparent from the following detailed description taken in connection with the accompanying drawing which is a schematic view and wiring diagram illustrating one type of condition control embodying the present invention.

While the invention is susceptible of various modifications and alternative constructions and of application to the control of various kinds of regulating devices for maintaining a wide variety of conditions, it has been shown in the drawing and will be described herein as applied to the control of a typical temperature changer. It will be understood that I do not intend to limit the invention by such exemplary disclosure but aim to cover all modifications, alternative constructions, and uses falling within the spirit and scope of the invention as expressed in the appended claims.

The temperature changer herein shown is a radiator type heater 5 adapted to heat a room or other space 6 in which the condition controlling instrument 7 is located. Heat is supplied to the radiator from a source, such as a boiler 8, and the heater capacity is modulated in accordance with the changes in the position of a regulating member 9 of a valve 10 actuated by an electric motor operator 11. The degree of valve opening and therefore the capacity of the heater are varied by a cam 12 on a shaft 11ª which is oscillated varying distances back and forth with a graduated movement by a reversible electric motor 13 operating through speed reduction gearing 14.

Preferably, the motor is of the shaded pole induction type having a winding 19 constantly energized from a voltage source 15 of alternating current and a rotor 16 arranged to turn counter-clockwise and clockwise respectively according to which of two sets of shading coils 17 and 18 is short-circuited, the rotor remaining idle when both sets are open-circuited. Thus, the valve member 9 moves toward closed position when the coils 17 are short-circuited.

Control of the coils 17 and 18 to produce the primary response or proportioning action is effected by switches 20 and 21 of one thermostat of the instrument 7 acting in conjunction with switches 49 and 57 of a second thermostat which may be incorporated in the same instrument. The switches 20 and 21 have stationary contacts coacting with a movable contact 22 on the free end of an arm 23 which, in this instance, takes the form of a resiliently flexible bimetallic strip mounted on and projecting from a support 24. The strip thus constitutes a seat of the force which is created in response to ambient temperature changes, the switch 21 being closed in response to a fall in temperature below the control point of the thermostat. The switches 49 and 57 have stationary contacts coacting with a movable contact on an arm 60 which comprises a bimetallic strip. Means (not shown) may be provided for adjusting the support 24 manually to vary the control points of both thermostats which have approximately the same control point setting.

Herein the short-circuit for the coils 17 extends through a conductor 45, a limit switch 46 which is allowed to open by a cam 47 only when the valve 10 is fully closed, a conductor 48, the switch 49, a conductor 50 grounded at 58, switch 20, and a conductor 59. The other short-circuit is from the switch 21 through a conductor 51, the coils 18, a conductor 52, a switch 53 closed by a cam 54 except when the valve is fully open, a conductor 56, the switch 57, the conductor 50, the switch 21, and a conductor 51. The circuits are hereinafter referred to as the main control circuits.

Near its free end, the arm 23 is connected by a contractile spring 25 to the armature 26 of a solenoid 27 which coacts with the switches 20 and 21 to form a balanced magnetic relay. The degree of energization of the solenoid winding 28 determines the effective control point of the thermostat for any given manual adjustment. Energization of the winding 28 is controlled by a rheostat 29 having a fixed resistance 30 connected by a conductor 31 to one side of the power source 15 and a contact arm 32 movable across the resistance and connected by a conductor 33 to one terminal of the winding 28. The other terminal is grounded and thereby connected to the other side of the power source.

The contact arm 32 is moved across the resistance by power derived from the motor 13 and, for reasons to appear later, the extent of the motion of the main operating shaft 11a is transmitted to a shaft 34 carrying the arm 32 through the medium of a friction clutch 35 having driving and driven members 36 and 37 constantly urged into gripping engagement by springs 38. The movement of the rheostat arm is limited to an adjustable range, equal to or shorter than that of the main shaft 11a. To this end, a disk 41 fast on the shaft 34 has inwardly converging surfaces or arms 39 and 40 engageable with a stop 42. The latter is on a screw 43 which is adjustable in a mounting 44 to move the stop radially and thereby vary the range of movement of the rheostat arm.

The apparatus as above described will operate with a so-called proportioning action in response to ambient temperature changes. That is to say, a change in temperature warps the strip 23 to mechanically upset the balance of the relay and close one of the switches 20 or 21 and the corresponding one of the switches 49 or 57. The master operator then runs in a corresponding direction and the valve 10 is repositioned to correct for the temperature change until the relay 27 is again balanced electrically by the adjustment of the rheostat 29 effected during the valve movement. Such primary response results in positioning of the valve in proportion to each temperature change.

The slower secondary response, which supplements the primary response and causes restoration of the controlled condition to a desired value with an intermittent action somewhat analogous to a so-called floating action, is produced in the present instance by causing continued operation of the motor 13 in the same direction but at a slower average rate than that of the primary response. To this end, the windings 17 and 18 are short-circuited through separate or auxiliary circuits selectively controlled by the switches 49 and 57 previously referred to. The construction is such that strip 60 closes the switch 57 whenever the ambient temperature is below a predetermined value desired to be maintained as determined by the manual adjustment of the thermostat as a whole.

To provide the separate short-circuits, the conductors 51 and 59 are conencted by conductors 61 and 62 to the stationary contacts of switches 63 and 64 having movable contacts on the free ends of bimetallic strips 65 and 66. The latter are mounted on insulating supports 67 and 68 and grounded at 69 through resistance heaters 70 and 71. Thus, the coils 17 may be short-circuited independently of the switch 20 through the switches 49 and 64 and the ground connection. Similarly, switches 57 and 63, when closed simultaneously, complete a circuit independent of the switch 21 through the coils 18. Completion of either of these circuits results in energization of one of the electric heaters 70 or 71 producing heat which is radiated to the associated bimetallic strip whereby to cause warping of the latter in a direction to eventually open its switch. Then, after a cooling period, the switch is again closed permitting reheating of the strip. This alternate heating and cooling of the bimetallic strips continues so long as either auxiliary circuit is closed at the switch 57 or the switch 49 and results in operation of the motor at an average speed lower than that at which the proportioning action occurs and in the same direction as this latter action.

The operation of the control is as follows. When the thermostat 7 is at the desired value determined by the manual adjustment, the tongue 60 is disposed in neutral position and its control switches will be open, switches 63 and 64 will, of course, be closed, and the valve 10 may be partially open. Assuming that the tongue 23 is also in neutral position at this time, both tongues will, in response to a temperature rise above the thermostat setting, be deflected downwardly closing the switches 20 and 49. The shading coils 17 are thus short-circuited through these switches and the circuit above described and the motor runs counter-clockwise closing the valve 10. In this movement, the rheostat arm 32 is turned clockwise resulting in a reduction in the current energizing the solenoid 27 and a corresponding reduction in the solenoid pull. When this has decreased sufficiently to allow the arm 23 to move upwardly opening the switch 20, the low resistance short-circuit will be broken.

Since the room temperature falls slowly in response to the reduction in steam supply, the switch 49 remains closed, thereby maintaining the short-circuit for the coils 17 through the switch 64 and the electric heater 71. Operation of the motor thus continues in the same direction and the valve is moved beyond the position determined by the extent of temperature deviation. After a short interval, the bimetallic strip 66 is warped under the influence of the heat generated by the heater 71 and the switch 64 is opened. The auxiilary shading circuit through the switches 64 and 49 is thus interrupted, stopping the motor and allowing the heater 71 to cool. After a short cooling interval, the switch 64 again closes and since the thermostat switch 49 is still closed the motor 13 is again started to further close the valve. Such intermittent operation of the motor and closing of the valve continues until the room temperature has been reduced to the thermostat setting as evidenced by opening of the switch 49. In this way, there is a continued further closing of the valve after the primary response or proportioning action has taken place. This over-correction or secondary response is at a slower average rate than the primary response because it is intermittent and the result of such over-correction is to cause full restoration of the temperature to the desired value thereby eliminating the temperature drop inherent in systems of the proportioning type.

In response to a fall in room temperature below the desired value, the action is reversed. That is, the valve is first opened by an amount proportional to the temperature fall, the shading coils 18 being short-circuited through the switches 21 and 57. The valve movement is discontinued when the energization of the solenoid 27 has changed sufficiently to restore the tongue 23 to neutral position. Then, the opening continues intermittently under the control of the auxiliary circuit for the shading coils 18 which extends through the switch 57, conductors 56 and 52, coils 18, conductor 61, switch 63, and the heater 70. Alternate heating and cooling of the bimetallic strip 65 causes intermittent closing of the switch 63 and corresponding opening of the valve. This slower average rate of valve opening continues until sufficient heat has been added to the room to restore the temperature fully to the desired value as evidenced by opening of the thermostat switch 57.

I claim as my invention:

1. A control system having, in combination, a reversible electric motor operator having a driven member and selectively energizable windings determining the direction of motor operation, main and auxiliary circuits connected in parallel and controlling the energization of said windings, means controlled by condition deviations and controlling said main circuits to cause modulation of said member in proportion to each condition deviation, thermo-electric relays each including a switch and a heater resistance in one of said auxiliary circuits and a warp element influenced by the heater to open the switch upon heating to a predetermined temperature, said means including switches each in one of said auxiliary circuits, and means for closing one or the other of said last mentioned switches in response to rises and falls in said condition above and below a predetermined value.

2. A control system having, in combination, a reversible electric motor operator having a driven member and selectively energizable windings determining the direction of motor operation, main and auxiliary circuits connected in parallel and controlling the energization of said windings, means controlled by condition deviations and controlling said main circuits to cause modulation of said member in proportion to each condition deviation, said means including a switch in each of said auxiliary circuits, means for closing one or the other of said last mentioned switches in response to rises and falls in said condition above and below a predetermined value, and means for opening each auxiliary circuit intermittently while its control switch remains closed.

3. A control system having, in combination, a reversible electric motor operator having a driven member and selectively energizable windings determining the direction of motor operation, a main and an auxiliary energizing circuit for one of said windings, condition responsive means governing said main circuit to cause modulation of said member in proportion to a condition deviation in one direction, and means operable during a condition deviation in said one direction beyond a predetermined value to close said auxiliary circuit intermittently.

4. A control system having, in combination, a reversible electric motor operator having a driven member and selectively energizable windings determining the direction of motor operation, main and auxiliary circuits connected in parallel and controlling the energization of said windings, means controlled by condition deviations and governing said main circuit to cause modulation of said member in proportion to each condition deviation, said last mentioned means including a balancing potentiometer actuated in unison with said member through only a portion of the latter's range of movement, and means operable during a rise of said condition above or a fall thereof below a predetermined value for closing one or the other of said auxiliary circuits intermittently.

5. A control system having, in combination, a reversible electric motor operator having a driven member, means controlled by deviations of a condition from a desired value and controlling said operator to modulate the position of said member in proportion to each condition deviation, said last mentioned means including a voltage regulator having a movable element, a friction clutch drive connection between said member and said element, stop means limiting the movement of said element to a selected proportion of the range of said member, and secondary condition responsive means controlling said operator to cause operation thereof at a slower average speed than the proportioning action so long as said condition deviates from a predetermined value.

6. A control system having, in combination, a driven member, an electric motor driving means therefor selectively energizable to drive said member in opposite directions, main and auxiliary energizing circuits individually governing the energization of said driving means to determine the direction and extent of operation thereof, primary condition responsive means governing said main circuit to cause said driving means to modulate the position of said member variably in proportion to changes in the condition value, and secondary condition responsive means operable throughout the persistence of a deviation in the value of said condition from a predetermined value to energize said auxiliary circuit intermittently and cause further movement of said member at a slower average speed.

7. A control system having, in combination, a driven member, an electric motor driving means therefor selectively energizable to drive said member in opposite directions, main and auxiliary energizing circuits individually governing the energization of said driving means to determine the direction and extent of operation thereof, primary condition responsive means governing said main circuit to cause said driving means to modulate the position of said member variably in proportion to changes in the condition value, and secondary condition responsive means operable throughout the persistence of a condition deviation from a predetermined value to energize said auxiliary circuit intermittently and cause further movement of said member at a slower average speed, said last mentioned means including thermo-responsive means for producing alternate closure and opening of said auxiliary circuit.

8. A control system having in combination, a driven member, an electric motor driving means therefor selectively energizable to drive said member in opposite directions, main and auxiliary energizing circuits individually governing the energization of said driving means to determine the direction and extent of operation thereof, said auxiliary circuit including means for causing movement of said member by said driving means at a slower average speed than the speed of operation under the control of said main circuit, primary condition responsive means governing said main circuit to cause said driving means to modulate the position of said member variably in proportion to changes in the condition value, and secondary condition responsive means operable throughout the persistence of a condition deviation from a predetermined value to govern the energization of said auxiliary circuit and cause further movement of said member at said slower average speed.

EDGAR D. LILJA.